(12) United States Patent
Kuo et al.

(10) Patent No.: US 8,269,935 B2
(45) Date of Patent: Sep. 18, 2012

(54) LIQUID CRYSTAL DISPLAY

(75) Inventors: Chun-Yi Kuo, Tainan County (TW);
Wu-Liu Tsai, Tainan County (TW);
Fuh-Tsang Wu, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 578 days.

(21) Appl. No.: 12/499,180

(22) Filed: Jul. 8, 2009

(65) Prior Publication Data
US 2010/0007833 A1 Jan. 14, 2010

(30) Foreign Application Priority Data
Jul. 8, 2008 (TW) .............................. 97125744 A

(51) Int. Cl.
*G02F 1/1337* (2006.01)
(52) U.S. Cl. .......................... 349/129; 349/139; 349/114
(58) Field of Classification Search .................. 349/129, 349/139, 43, 143, 114
See application file for complete search history.

(56) References Cited

U.S. PATENT DOCUMENTS

| | | | |
|---|---|---|---|
| 7,209,205 B2* | 4/2007 | Yoshida et al. | 349/139 |
| 7,342,629 B2* | 3/2008 | Yoshida et al. | 349/130 |
| 7,518,684 B2* | 4/2009 | Huang et al. | 349/129 |
| 2002/0159018 A1 | 10/2002 | Kataoka et al. | |
| 2006/0066795 A1* | 3/2006 | Hsu et al. | 349/136 |

FOREIGN PATENT DOCUMENTS
CN 1949062 4/2007

OTHER PUBLICATIONS

Chinese language office action dated Feb. 1, 2012.
English language translation of abstract of CN 1949062 (published Feb. 1, 2012).

* cited by examiner

*Primary Examiner* — Thoi Duong
(74) *Attorney, Agent, or Firm* — Thomas|Kayden

(57) ABSTRACT

A liquid crystal display is provided. The liquid crystal display having a plurality of pixel regions includes a first substrate, a second substrate and a liquid crystal layer. The second substrate has a patterned electrode layer having a plurality of complete coverage regions and at least one slit distribution region. Each of the complete coverage regions is located in a corresponding pixel region. The liquid crystal layer is disposed between the first substrate and the second substrate. Liquid crystal molecules of the liquid crystal layer have various slanting directions, and each of the complete coverage regions is located at a slanting center of the slanting directions of the liquid crystal molecules. The slit distribution region is used for stabilizing the slanting directions of liquid crystal molecules within the liquid crystal layer.

17 Claims, 13 Drawing Sheets

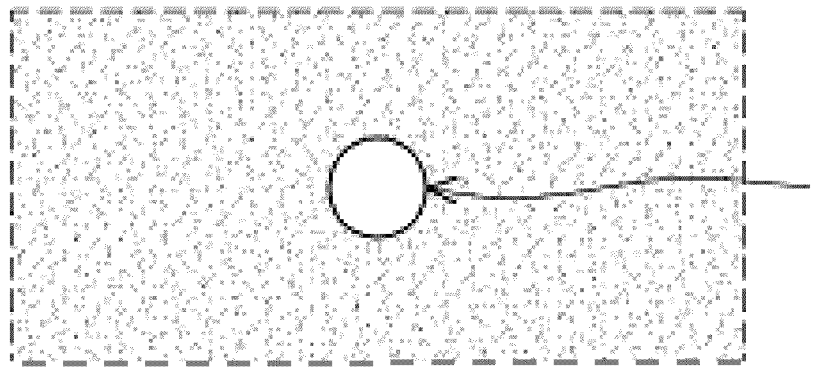
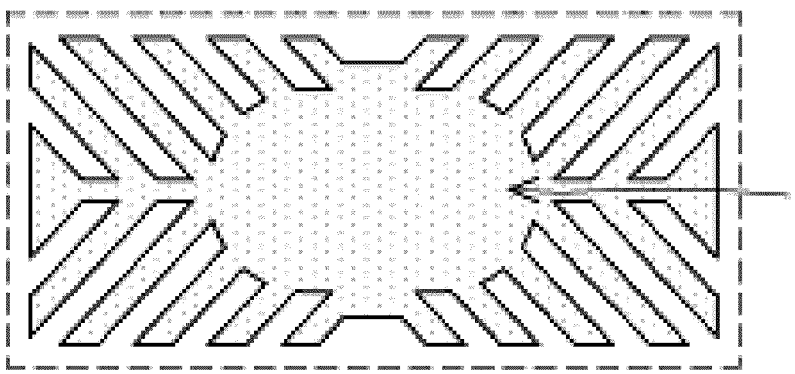
FIG. 8
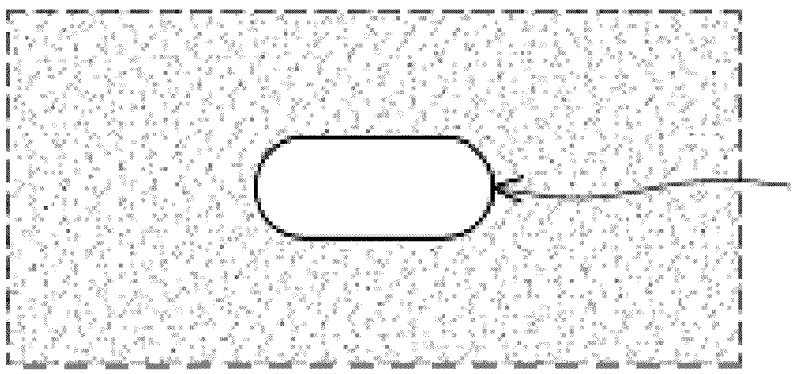
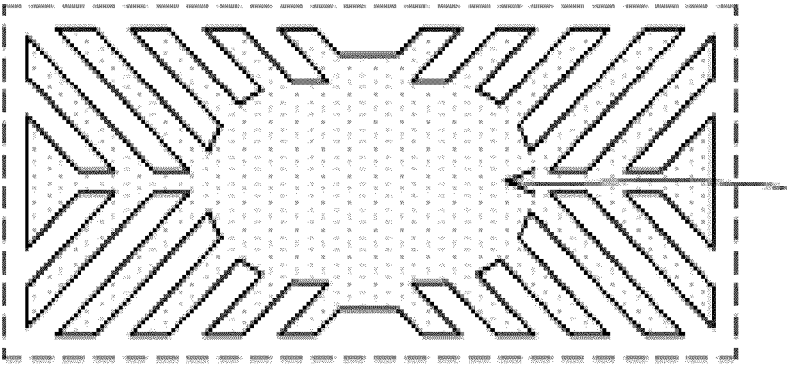
FIG. 9

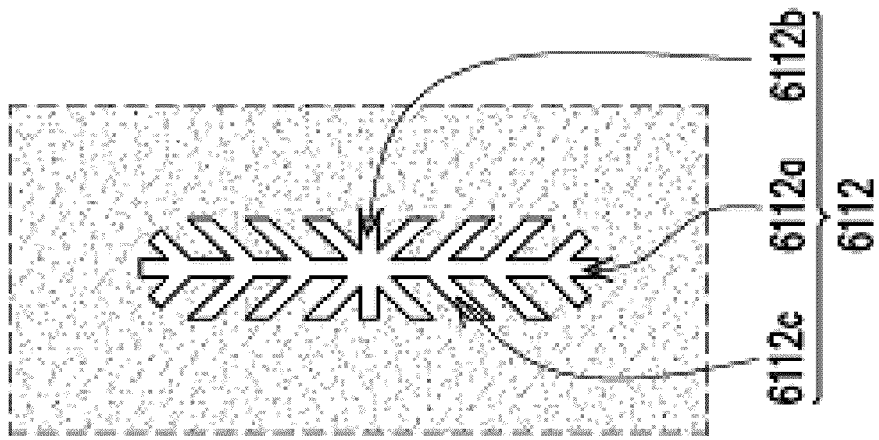
FIG. 11
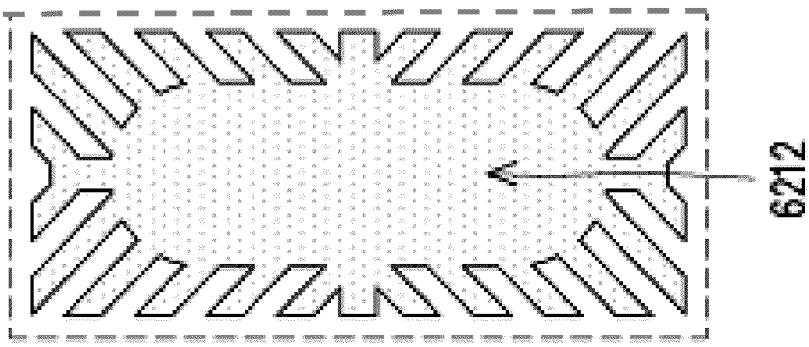
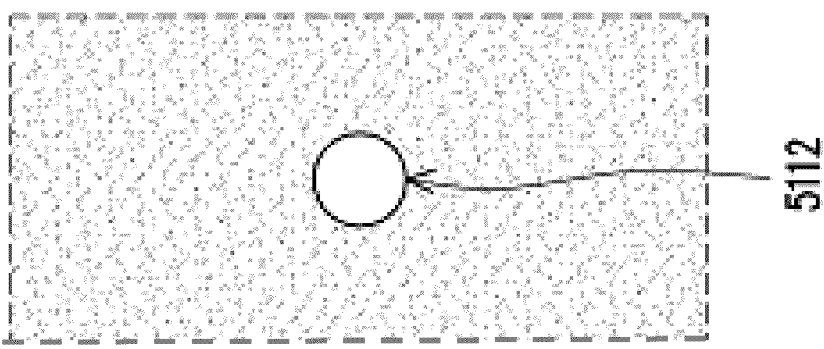
FIG. 10
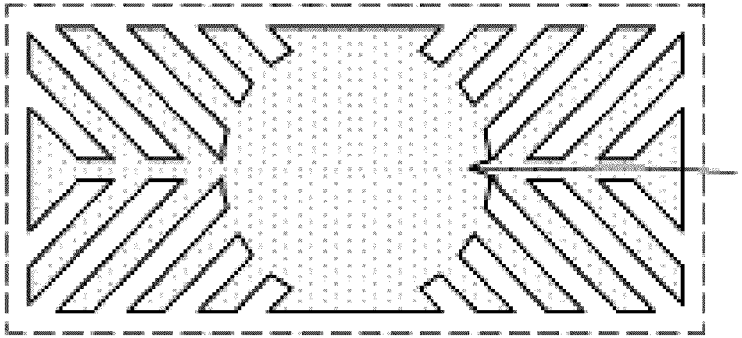

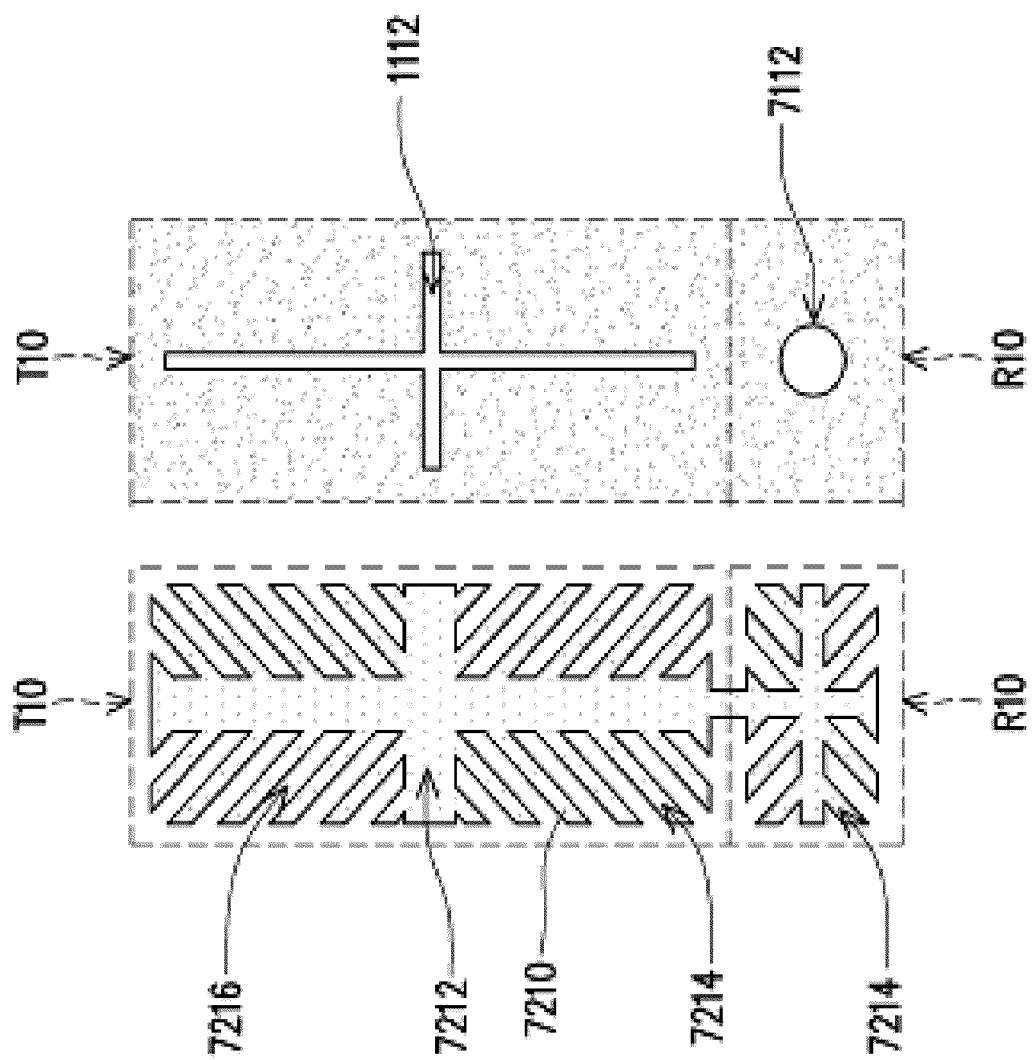

LIQUID CRYSTAL DISPLAY

TECHNICAL FIELD

The present disclosure relates to a display device, and more particularly to a liquid crystal display (LCD).

BACKGROUND

Society has benefited from the rapid development of multimedia, particularly from the tremendous progress in semiconductor devices or display devices. Among various display apparatuses, thin film transistor liquid crystal displays (TFT-LCDs), which are characterized by high resolution, high density, low power consumption, and no radiation, have become mainstream products in the display industry.

To date, the liquid crystal displays (LCDs) with high contrast ratio, no gray scale inversion, low color shift, high luminance, full color, high color saturation, high responsive speed, and wide viewing angles are required. In order to provide the wide viewing angles, some displays, such as twisted nematic (TN) liquid crystals with wide-view films, in-plane switching (IPS) LCDs, fringe field switching (FFS) LCDs, and multi-domain vertical alignment (MVA) LCDs, have been developed.

In conventional MVA LCDs, silts or protrusions are usually formed on two electrodes under and above a liquid crystal (LC) layer, such that LC molecules may slant in various directions and then the wide viewing angle of the LCD panel is achieved. However, transmittance of the conventional MVA LCDs is poor, and the LC molecules usually cannot recover after the MVA LCD is pressed.

SUMMARY

The present disclosure provides a LCD having enhanced transmittance.

The present disclosure also provides a pixel structure having enhanced transmittance.

An LCD in the present disclosure has a plurality of pixel regions. The LCD includes a first substrate, a second substrate, and a LC layer. The second substrate has a patterned electrode layer. The patterned electrode layer has a plurality of complete coverage regions and at least one slit distribution region. Each of the complete coverage regions is located in the corresponding pixel region. The liquid crystal layer is disposed between the first substrate and the second substrate. A plurality of LC molecules of the LC layer have various slanting directions, and each of the complete coverage regions is located at a slanting center of the slanting directions of the LC molecules. The slit distribution region is used for stabilizing the slanting directions of the LC molecules.

In an embodiment of the present disclosure, the first substrate of the LCD has a domain formation means. The domain formation means comprises a plurality of first domain formation means. A shape of each of the first domain formation means is point symmetric, and each of the first domain formation means is disposed in the corresponding pixel region. An area of a projection of each complete coverage region on the first substrate is larger than an area of the corresponding first domain formation means on the first substrate. Besides, the projection of each complete coverage region on the first substrate completely covers the corresponding first domain formation means.

In an embodiment of the present disclosure in which the first substrate of the LCD has the domain formation means, the first substrate further has a common electrode, and the second substrate further has a plurality of scan lines, a plurality of data lines and a plurality of active devices. The patterned electrode layer includes a plurality of pixel electrodes. Each of the pixel electrodes has one of said complete coverage regions. The data lines and the scan lines define the pixel regions. Each of the active devices is located in the corresponding pixel region and is driven via the corresponding scan line. Each of the pixel electrodes is located in the corresponding pixel region and is electrically connected to the corresponding active device so as to receive a signal transmitted via the corresponding data line. In addition, each of the first domain formation means is a domain formation protrusion disposed on the common electrode or a hollow region of the common electrode, for example. Moreover, the first substrate further has an overcoating layer, for example, and the common electrode is between the LC layer and the overcoating layer. Besides, the second substrate further includes an overcoating layer, for example. The scan lines, the data lines and the active devices are at the same side of the overcoating layer, and the patterned electrode layer and the active devices are disposed on two opposite sides of the overcoating layer.

In another embodiment of the present disclosure in which the first substrate of the LCD has the domain formation means, the first substrate further has a plurality of scan lines, a plurality of data lines, a plurality of pixel electrodes and a plurality of active devices. The data lines and the scan lines define the pixel regions. Each of the active devices is located in the corresponding pixel region and is driven via the corresponding scan line. Each of the pixel electrodes is located in the corresponding pixel region and is electrically connected to the corresponding active device so as to receive a signal transmitted via the corresponding data line. The patterned electrode layer is a common electrode. In addition, each of the first domain formation means is a domain formation protrusion disposed on the corresponding pixel electrode, for example. Alternatively, each of the first domain formation means is a hollow region of the corresponding pixel electrode. Besides, the first substrate further has an overcoating layer, for example. The scan lines, the data lines and the active devices are at the same side of the overcoating layer, and the pixel electrodes and the active devices are disposed on two opposite sides of the overcoating layer. Furthermore, the second substrate further has an overcoating layer, and the common electrode is between the LC layer and the overcoating layer.

In an embodiment of the LCD of the present disclosure, a shape of each of the first domain formation means is a circle, an ellipse or a cross.

In an embodiment of the LCD of the present disclosure, each of the first domain formation means has a first branch, a second branch and a plurality of third branches. The first branch and the second branch are substantially perpendicular to one another such that four quadrants are defined. Azimuths of the third branches relative to the second branch in the same quadrant are the same, and the azimuths of the third branches in the quadrants are respectively 45 degrees, 135 degrees, 225 degrees and 315 degrees.

In an embodiment of the LCD of the present disclosure, each of the pixel regions is divided into a transparent region and a reflective region, and the first domain formation means are located in the transparent regions. Furthermore, the first substrate further has a plurality of second domain formation means, for example, and each of the second domain formation means is located in the corresponding reflective region.

In an embodiment of the LCD of the present disclosure, each of the pixel regions is divided into four quadrants. In addition, a plurality of slits of the slit distribution region in the same quadrant are parallel to one another, and the slits in any one of the quadrants are substantially perpendicular to the slits in the adjacent quadrants.

In an embodiment of the LCD of the present disclosure, a shape of each of the complete coverage regions is a circle, an ellipse or a cross.

In one embodiment of present disclosure, the LCD further includes a backlight module on which the first substrate, the second substrate and the LC layer are disposed correspondingly.

In an embodiment of the present disclosure, the first substrate of the LCD has a domain formation means. The domain formation means includes an LC stabilizing polymer layer for controlling the slanting directions of the LC molecules on a surface of the first substrate.

In an embodiment of the LCD of the present disclosure, the LC stabilizing polymer layer is polymerized from a plurality of reactive group monomers which have reactive groups. The reactive groups of the reactive group monomers can be acrylate, methacrylate or epoxy.

In an embodiment of the LCD of the present disclosure, a molecular formula of the reactive group monomers is represented as formula (1):

formula (1):

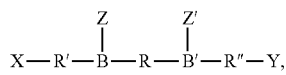

wherein B, B' are aromatic or saturated ring core;
X and Y are reactive groups;
R, R' and R" are binding groups; and
Z and Z' are side chain substituents. Said R, R' and R" respectively includes a monomer having a reactive free radical, e.g. alkylene, ester group or ether group. For example, the reactive group monomer may be:

line. Furthermore, the first substrate further includes an overcoating layer, for example, and the common electrode is between the LC layer and the overcoating layer. Besides, the second substrate further has an overcoating layer, for example. The scan lines, the data lines and the active devices are at the same side of the overcoating layer, and the patterned electrode layer and the active devices are disposed on two opposite sides of the overcoating layer.

In another embodiment of the present disclosure in which the first substrate of the LCD has the LC stabilizing polymer layer, the first substrate further has a plurality of scan lines, a plurality of data lines, a plurality of pixel electrodes and a plurality of active devices. The data lines and the scan lines define the pixel regions. Each of the active devices is located in the corresponding pixel region and is driven via the corresponding scan line. Each of the pixel electrodes is located in the corresponding pixel region and is electrically connected to the corresponding active device so as to receive a signal transmitted via the corresponding data line. The patterned electrode layer is a common electrode. Besides, the first substrate further has an overcoating layer, for example. The scan lines, the data lines and the active devices are at the same side of the overcoating layer, and the pixel electrodes and the active devices are disposed on two opposite sides of the overcoating layer. Furthermore, the second substrate further has an overcoating layer, and the common electrode is between the LC layer and the overcoating layer.

In an embodiment of the LCD of the present disclosure, each of the pixel regions is divided into a transparent region and a reflective region. Besides, each of the transparent regions and each of the reflective regions are divided into four quadrants, for example. A plurality of slits of the slit distribution region in the same quadrant are parallel to one another, and the slits in any one of the quadrants are substantially perpendicular to the slits in the adjacent quadrants.

In an embodiment of the LCD of the present disclosure, a shape of each of the complete coverage regions is point sym-

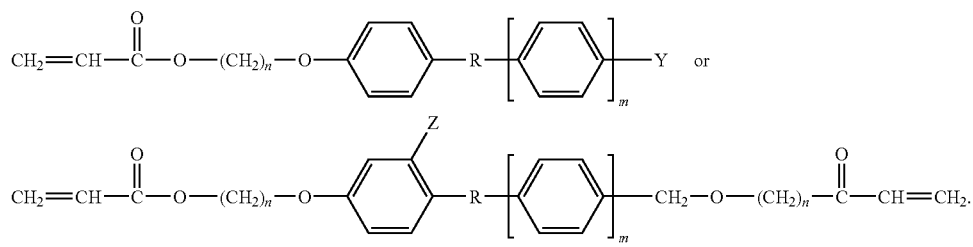

In an embodiment of the present disclosure in which the first substrate of the LCD has the LC stabilizing polymer layer, the first substrate further has a common electrode, and the LC stabilizing polymer layer is between the common electrode and the LC layer. Besides, the second substrate further has a plurality of scan lines, a plurality of data lines and a plurality of active devices. The patterned electrode layer includes a plurality of pixel electrodes. Each of the pixel electrodes has one of said complete coverage regions. The data lines and the scan lines define the pixel regions. Each of the active devices is located in the corresponding pixel region and is driven via the corresponding data line. Each of the pixel electrodes is located in the corresponding pixel region and is electrically connected to the corresponding active device so as to receive a signal transmitted via the corresponding data metric, and the symmetric center is the slanting center of the slanting directions of the LC molecules.

A pixel structure of the present disclosure is used for controlling slanting directions of a plurality of LC molecules. The pixel structure includes a patterned electrode layer. The patterned electrode layer has at least one complete coverage region and at least one slit distribution region. The complete coverage region is located at a slanting center of the slanting directions of the LC molecules, and the slit distribution region is used for stabilizing the slanting directions of the LC molecules.

In an embodiment of the present disclosure, the pixel structure further includes a domain formation means disposed relative to the patterned electrode layer. The domain formation means includes at least one first domain formation means. A shape of the first domain formation means is point symmetric. An area of the complete coverage region is larger than an area of the first domain formation means, and a projection of the complete coverage region completely covers the first domain formation means. Besides, the first domain formation means is a domain formation protrusion, for example. Furthermore, a shape of the first domain formation means is a circle, an ellipse or a cross. In addition, the first domain formation means has a first branch, a second branch and a plurality of third branches. The first branch and the second branch are substantially perpendicular to one another such that four quadrants are defined. Azimuths of the third branches relative to the second branch in the same quadrant are the same, wherein the azimuths of the third branches in the quadrants are respectively 45 degrees, 135 degrees, 225 degrees and 315 degrees. Moreover, the pixel structure is divided into a transparent region and a reflective region. The first domain formation means is located in the transparent region. Besides, a second domain formation means is disposed in the reflective region, for example. The second domain formation means has a first branch, a second branch and a plurality of third branches. The first branch and the second branch are substantially perpendicular to one another such that four quadrants are defined. Azimuths of the third branches relative to the second branch in the same quadrant are the same, wherein azimuths of the third branches in the quadrants are respectively 45 degrees, 135 degrees, 225 degrees and 315 degrees.

In an embodiment of the present disclosure, the pixel structure is divided into four quadrants, and a plurality of slits of the slit distribution region in the same quadrant are parallel to one another. In an embodiment of the pixel structure of the present disclosure, a shape of the complete coverage region is a circle, an ellipse or a cross.

In an embodiment of the pixel structure of the present disclosure, the pixel structure is divided into a transparent region and a reflective region. The transparent region and the reflective region are both divided into four quadrants, wherein a plurality of slits of the slit distribution region in the same quadrant are parallel.

In an embodiment of the pixel structure of the present disclosure, a shape of the complete coverage region is point symmetric, and the symmetric center is the slanting center of the slanting directions of the LC molecules.

In view of the above, the complete coverage region and the slit distribution regions of the patterned electrode layer of the LCD and the pixel structure of the disclosure can stabilize the slanting directions of the LC molecules. Thus, the LCD of the disclosure has high transmittance and the LC molecules recover easily after being pressed.

To make the above and other features and advantages of the present disclosure more comprehensible, several embodiments accompanied with figures are detailed as follows.

BRIEF DESCRIPTION OF THE DRAWINGS

The accompanying drawings are included to provide a further understanding of the disclosure, and are incorporated in and constitute a part of this specification. The drawings illustrate various embodiments and, together with the description, serve to explain the principles of the disclosure.

FIGS. 8 to 11 are respectively schematic diagrams of a domain formation means and a patterned electrode layer in a single pixel region of an LCD according to another four embodiments.

FIG. 12 is a schematic diagram of a domain formation means and a patterned electrode layer in a single pixel region according to another embodiment.

DETAILED DESCRIPTION

Figure 1:
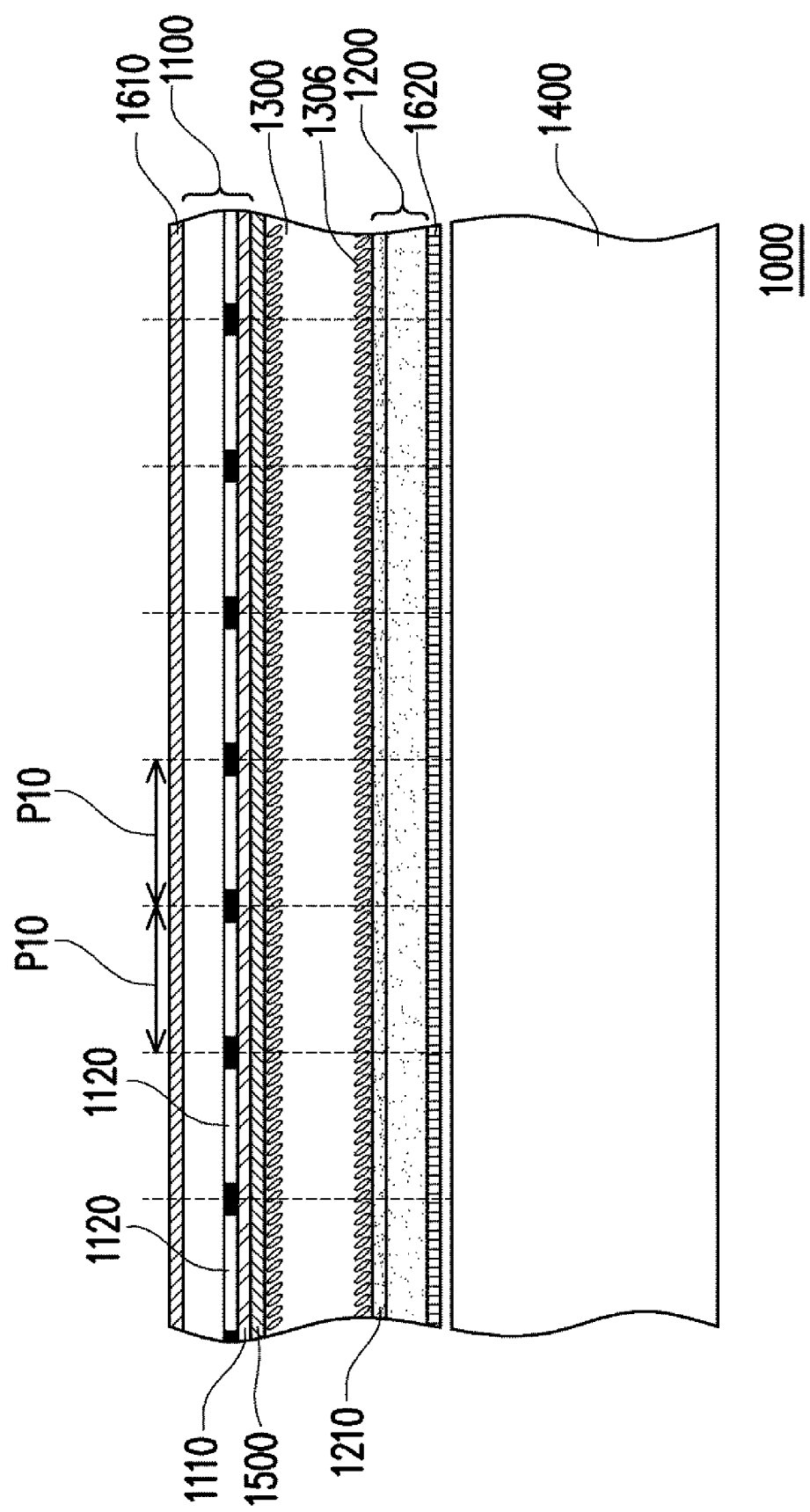
FIG. 1 is a partial cross-sectional view of an LCD according to an embodiment.

FIG. 1 is a partial cross-sectional view of an LCD according to an embodiment. Referring to FIG. 1, an LCD 1000 of the present embodiment includes a first substrate 1100, a second substrate 1200, and a liquid crystal layer 1300. Here, the LCD 1000 is divided into a plurality of pixel regions P10. The LC layer 1300 is disposed between the first substrate 1100 and the second substrate 1200.

Figure 2:
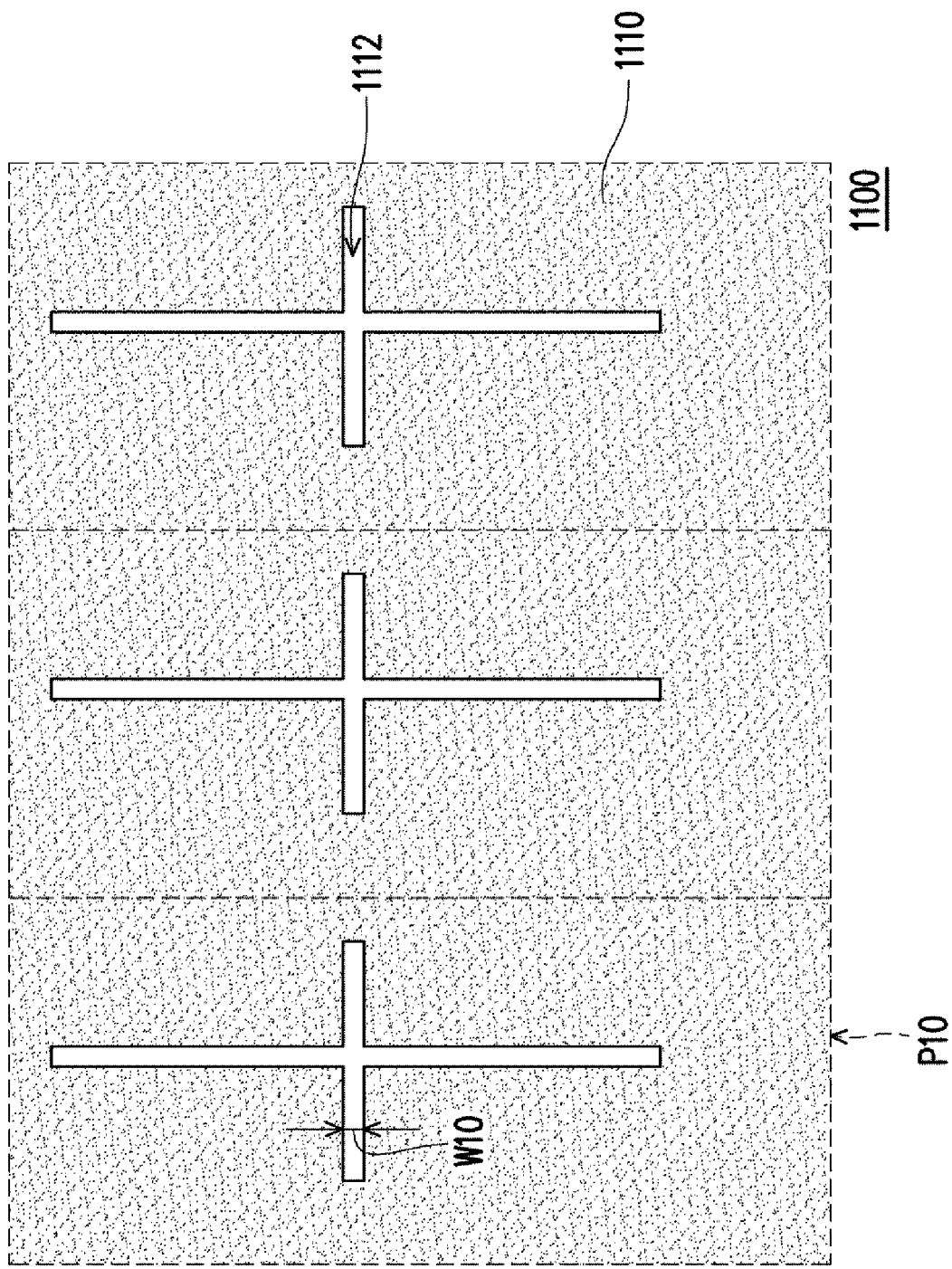
FIG. 2 is a partial front view of the first substrate of the LCD in FIG. 1.
Figure 3:
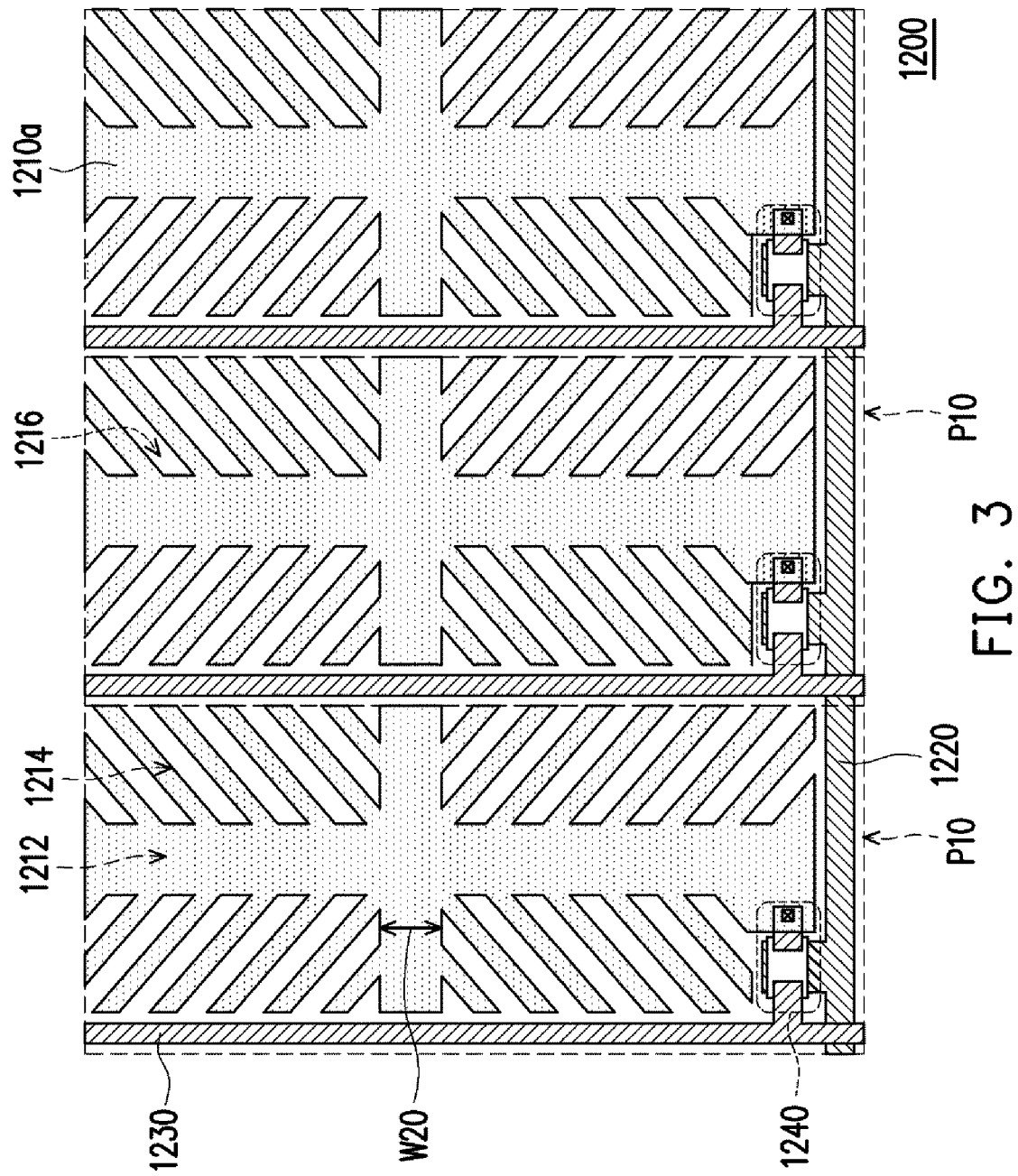
FIG. 3 is a partial front view of the second substrate of the LCD in FIG. 1.

FIG. 2 is a partial front view of the first substrate 1100 of the LCD in FIG. 1, and FIG. 3 is a partial front view of the second substrate 1200 of the LCD in FIG. 1. The regions respectively shown in FIG. 2 and FIG. 3 are approximately aligned. Referring to FIG. 1 and FIG. 2, the first substrate 1100 of the embodiment has a plurality of domain formation means 1112 and a common electrode 1110 as well. Each of the domain formation means 1112 is a hollow region of the common electrode 1110. Each of the domain formation means 1112 is located in a corresponding pixel region P10, and a shape of each of the first domain formation means 1112 is point symmetric. That is, the domain formation means 1112 forms a symmetric pattern having a center of symmetry. The shape of the domain formation means 1112 in the embodiment is a cross, for example.

Referring to FIG. 1 and FIG. 3, the second substrate 1200 has a patterned electrode layer 1210. The patterned electrode layer 1210 includes a plurality of complete coverage regions 1212 and at least one slit distribution region 1214. The embodiment is exemplified by a plurality of slit distribution regions 1214, and the shapes of the complete coverage regions 1212 are crosses, for example. Each of the complete coverage regions 1212 is a region that is completely covered by the material of the patterned electrode layer 1210. Each of the complete coverage regions 1212 is located in a corresponding pixel region P10. LC molecules (not shown) in the LC layer 1300 have a plurality of slanting directions, and each of the complete coverage regions 1212 is located at a slanting center of the slanting directions of the LC molecules. Each of the complete coverage regions 1212 forms a point symmetric pattern, and the symmetric center is the slanting center of the slanting directions of the LC molecules.

Referring to FIGS. 1 to 3, a projection of each of the complete coverage regions 1212 on the first substrate 1100 completely covers the corresponding domain formation means 1112. Specifically, each of the domain formation means 1112 is completely in the range of one complete coverage regions 1212 when viewing from a direction perpendicular to the first substrate 1100. Meanwhile, an area of the projection of each of the complete coverage regions 1212 on the first substrate 1100 is larger than an area of the corresponding domain formation means 1112 on the first substrate 1100. For example, a width W20 of a branch of the complete coverage region 1212 is greater than a width W10 of a branch of the domain formation means 1112.

Figure 4:
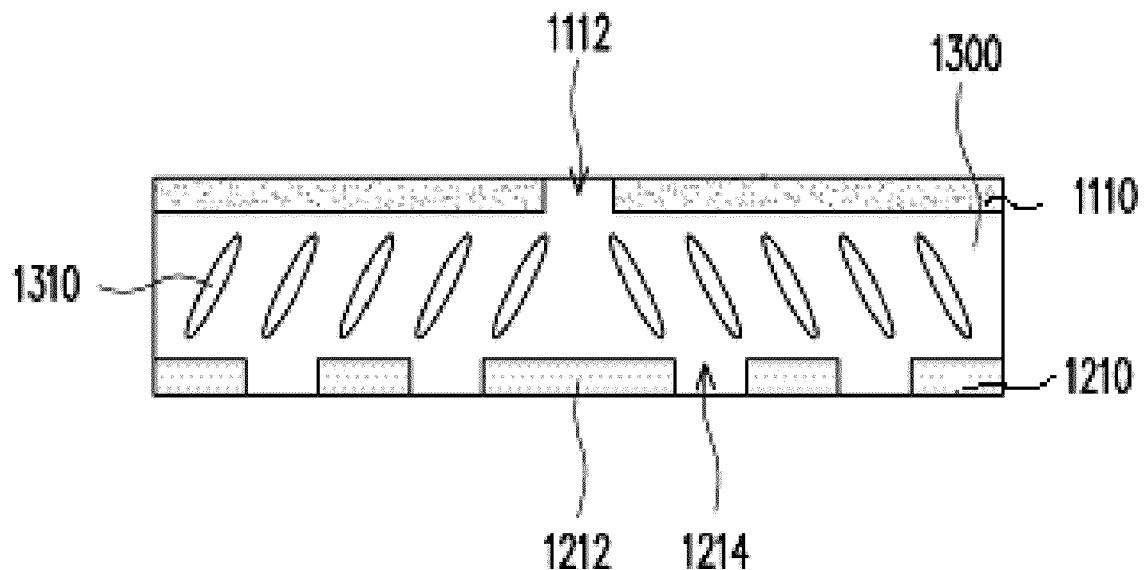
FIG. 4 is a partial enlarged view of a single pixel region of the LCD in FIG. 1.

FIG. 4 is a partial enlarged view of a single pixel region P10 of the LCD in FIG. 1, wherein the domain formation means 1112, the LC layer 1300, and the patterned electrode layer 1210 are illustrated. Referring to FIG. 4, the edge of the complete coverage region 1212 of the patterned electrode layer 1210 is outside the domain formation means 1112. Hence, when the LC layer 1300 is affected by an electric field formed between the common electrode 1110 and the patterned electrode layer 1210, the molecules 1310 at the edge of the domain formation means 1112 are effectively pushed outward. That is, the domain formation means 1112 is used for controlling the slanting directions of LC molecules 1310 in the LC layer 1300. In addition, since the shape of the domain formation means 1112 is point symmetric, the LC molecules 1310 are titled outward with respect to a symmetric point of the domain formation means 1112. Thus, multiple domains are formed, such that images observed from various viewing angles are uniform without color shift.

Referring to FIG. 3, in addition to the domain formation means 1112 used for controlling the slanting directions of LC molecules 1310 in the LC layer 1300, slits 1216 in the slit distribution regions 1214 further stabilize the slanting directions of LC molecules 1310. In the embodiment illustrated in FIG. 3, each of the pixel regions P10 is divided into four quadrants. Further, the slits 1216 of the slit distribution region 1214 in the same quadrant are substantially parallel to one another, and the slits 1216 in any one of the quadrants are substantially perpendicular to the slits 1216 in the adjacent quadrants.

As described above, since the complete coverage region 1212 and the slit distribution regions 1214 of the LCD 1000 adopt the above-mentioned design, a wide viewing angle is achieved. Moreover, the LCD 1000 also has an improved transmittance and transmittance contrast. Since the LCD 1000 is able to effectively stabilize the slanting directions of the LC molecules, the arrangement of the LC molecules is easily restored after the LCD 1000 is pressed. In addition, the LCD 1000 of the embodiment includes the domain formation means 1112, which further enhances the control on the slanting directions of the LC molecules 1310 in the LC layer 1300. Hence, the transmittance and transmittance contrast of the LCD 1000 are enhanced.

Referring to FIG. 3, a pixel structure of the embodiment includes the above-mentioned patterned electrode layer 1210. The patterned electrode layer 1210 includes one or more of the above-mentioned complete coverage regions 1212 and at least one slit distribution region 1214. The point symmetric center of complete coverage region 1212 is located at the slanting center of the slanting directions of the LC molecules 1310, and the slit distribution region 1214 is used for stabilizing the slanting directions of LC molecules 1310. Furthermore, the pixel structure of this embodiment further includes the domain formation means 1112. Hence, the pixel structure of the embodiment is able to effectively stabilize the slanting directions of the LC molecules, such that the transmittance and transmittance contrast of the LCD that includes this pixel structure are enhanced. The following illustrates variety of options for the LCD 1000 and the pixel structure, but the present disclosure is not limited thereto.

Referring to FIG. 1 and FIG. 3, the second substrate 1200 is an active device array substrate, for example. Specifically, the patterned electrode layer 1210 of the second substrate 1200 includes a plurality of pixel electrodes 1210a isolated from each other. The second substrate 1200 further includes a plurality of scan lines 1220 (only one scan line is shown in FIG. 3), a plurality of data lines 1230 and a plurality of active devices 1240. Each of the pixel electrodes 1210a is respectively located in a pixel region P10 and includes one complete coverage region 1212. The pixel regions P10 are each defined by the scan lines 1220 and the data lines 1230. Each of the active devices 1240 is located in a pixel region P10 and electrically connected to a corresponding scan line 1220, a corresponding data line 1230 and a corresponding pixel electrode 1210a. The active device 1240 is driven via the corresponding scan line 1220, and the pixel electrode 1210a receives a signal transmitted by the corresponding data line 1230 via the active device 1240.

Referring to FIG. 1, the first substrate 1100 of the embodiment is a color filter substrate, for example. Namely, the first substrate 1100 has a plurality of color filter films 1120, which are respectively located in one of the pixel regions P10. However, the color filter films are not necessarily required in the LCD of the present disclosure. Also, in some embodiments, the color filter films may be disposed on the first substrate when the first substrate is designed as the active device array substrate. Further, the LCD 1000 further includes a backlight module 1400 for providing a surface light source. The first substrate 1100, the second substrate 1200 and the LC layer 1300 are disposed correspondingly to the backlight module 1400. In some embodiments, the LCD 1000 includes a transmissive design or a transflective design.

Additionally, the LCD 1000 further includes an alignment layer 1500 covering the common electrode 1210, and the alignment layer 1500 is near the LC layer 1300 so as to establish an alignment. In the embodiment, the LC layer 1300 first may be uniformly doped with a plurality of reactive group monomers (not shown). The plurality of reactive group monomers then form a LC stabilizing polymer layer 1306 on the surface of the first substrate 1100 and/or the second substrate 1200 after polymerization. The LC stabilizing polymer layer 1306 enhances an anchor force on the LC molecules in the LC layer 1300 by the alignment layer 1500, so that the slanting directions of LC molecules are stabilized and the response rate of the LC molecules is enhanced. Hence, the LCD 1000 has wider viewing angle than a conventional LCD. Moreover, a faster response rate is achieved such that the image sticking is reduced.

In addition, after the polymerization process, the plurality of reactive group monomers are able to polymerize on the surface of the first substrate 1100 or on the surface of the second substrate 1200 alone. Alternatively, the reactive group monomers may polymerize on both the first substrate 1100 and the second substrate 1200 as well. When the LC stabilizing polymer layer 1306 is formed on the surface of the alignment layer 1500 under an applied voltage, a polymeric structure is formed along the slanting directions according to the patterned electrode layer. Hence, when the electric field applied on the LC layer 1300 disappears, the LC stabilizing polymer layer 1306 on the alignment layer 1500 quickly pulls back the LC molecules to a predetermined orientation, thereby helping reduce the response time of the LC molecules in the LC layer 1300 in the next time. As a result, the response time of the LC molecules is reduced and the image sticking is reduced. In addition, in order to achieve good pre-tilt effects of the LC molecules, the fabrication cost of the alignment layer 1500 is relatively high. However, the requirement to the quality of alignment layer 1500 is able to be reduced by using the LC stabilizing polymer layer 1306, such that the fabrication cost of the total LCD is reduced.

For example, the molecular structure of the reactive group monomer may be:

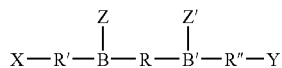

wherein B, B' are aromatic or saturated ring core, X and Y are reactive groups, R, R' and R" are binding groups, and Z and Z' are side chain substituents, for example. The reactive groups X and Y may be methacrylate or epoxy. R, R' and R" may be respectively a monomer having reactive free radicals, e.g. alkylene, ester group or ether group. More particularly, the reactive group monomer is, for example:

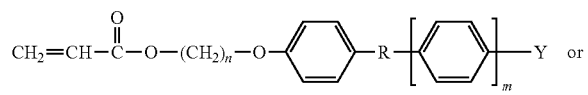

The LCD 1000 further includes, for example, a first polarizer 1610 and a second polarizer 1620. The first polarizer 1610 is disposed on the surface of first substrate 1100 away from the LC layer 1300 (i.e., the first polarizer 1610 and the LC layer 1300 are respectively disposed on two opposite sides of the first substrate 1100). The second polarizer 1620 is disposed on the surface of second substrate 1200 away from the LC layer 1300, i.e. the second polarizer 1620 and the LC layer 1300 are respectively disposed on two opposite sides of the second substrate 1200. Both of the first polarizer 1610 and the second polarizer 1620 are linear polarizers and disposed in a manner in which transmitting axes of the first polarizer 1610 and the second polarizer 1620 are perpendicular to each other. Alternatively, both of the first polarizer 1610 and the second polarizer 1620 may be circular polarizers as well.

It should be noted that the domain formation means 1112, as an example in this embodiment, is the hollow region of the common electrode 1110. However, in other embodiments (not shown here), the domain formation means may be an LC stabilizing polymer layer, which is used for controlling the slanting directions of the LC molecules in the LC layer as well. For example, the LC stabilizing polymer layer is polymerized from a plurality of reactive group monomers which have a plurality of reactive groups. (Here, the LC stabilizing polymer layer and the above-mentioned LC stabilizing polymer layer 1306 are the same.) The LC stabilizing polymer layer may polymerize on the surface of the common electrode alone and contact the LC molecules, or polymerize on the surface of the pixel electrode alone and contact the LC molecules. Alternatively, the LC stabilizing polymer layer may also polymerize on both the surface of the common electrode and the surface of the pixel electrode. The LC stabilizing polymer layer may be produced by sealing the LC layer between the first substrate and the second substrate first, wherein the reactive group monomers are distributed within the LC layer.

Next, an electric field is applied between the pixel electrodes and the common electrode, such that the LC molecules in the LC layer are titled according to the electric field distribution affected by the complete coverage region and the slit distribution regions. Meanwhile, by UV illumination, heating or other manners, the reactive group monomers are polymerized to form the LC stabilizing polymer layer. The method applied on the reactive group monomer for forming the LC stabilizing polymer layer varies depending on the characteristic of materials thereof. Hence, the tilt-angles of the LC molecules near the reactive group monomers after polymerization are maintained the same as those during polymerization. As a result, when the LC molecules in the LC layer are driven by an electric field, the LC molecules can rotate at a high speed such that the response time of the LC molecules is reduced. Compared with forming the hollow region in the common electrode by a mask, at least one mask process can be omitted by using the LC stabilizing polymer layer as the domain formation means.

Figure 5:
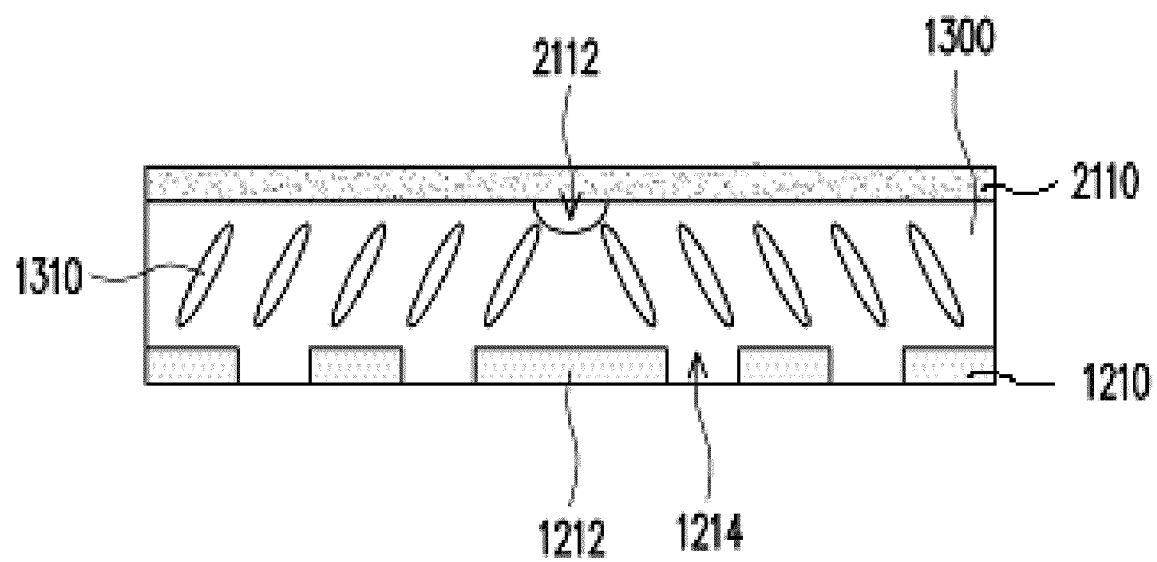
FIG. 5 is a partial enlarged view of a single pixel region of an LCD according to another embodiment.

FIG. 5 is a partial enlarged view of a single pixel region of an LCD according to another embodiment. Only a common electrode 2110, a first domain formation means 2112, the LC layer 1300 and the patterned electrode layer 1210 are shown in FIG. 5. The same reference numbers are used to represent same or similar elements. The common electrode 2110 is an intact electrode, and the first domain formation means 2112 is a domain formation protrusion disposed on the common electrode 2110. The function of the first domain formation means 2112 is the same as that of the domain formation means 1112 in FIG. 4. Both of them control the slanting directions of the LC molecules 1300 in the LC layer 1300.

Figure 6:
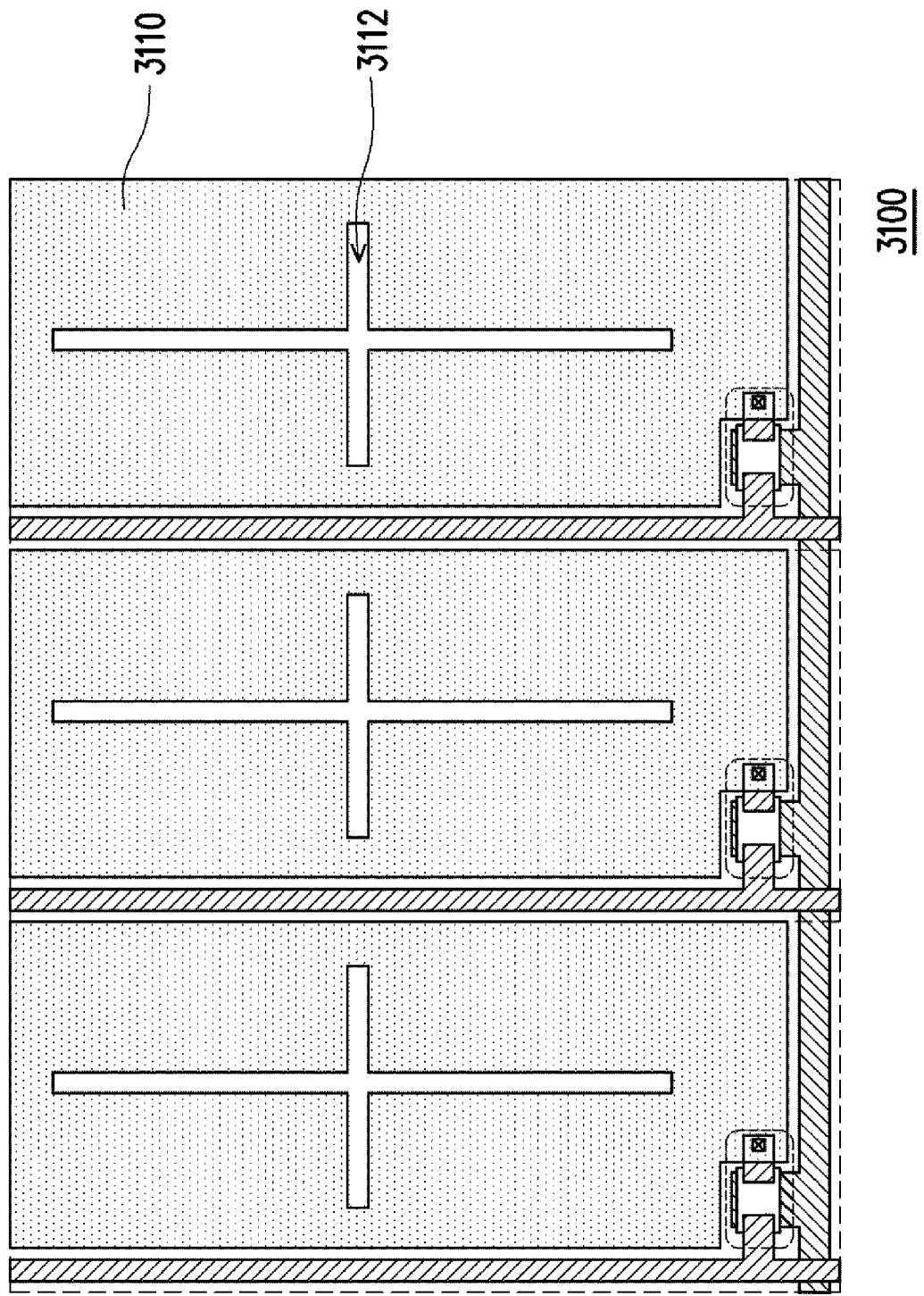
FIG. 6 and FIG. 7 are respectively partial cross-sectional views of first and second substrates of an LCD according to another embodiment.
Figure 7:
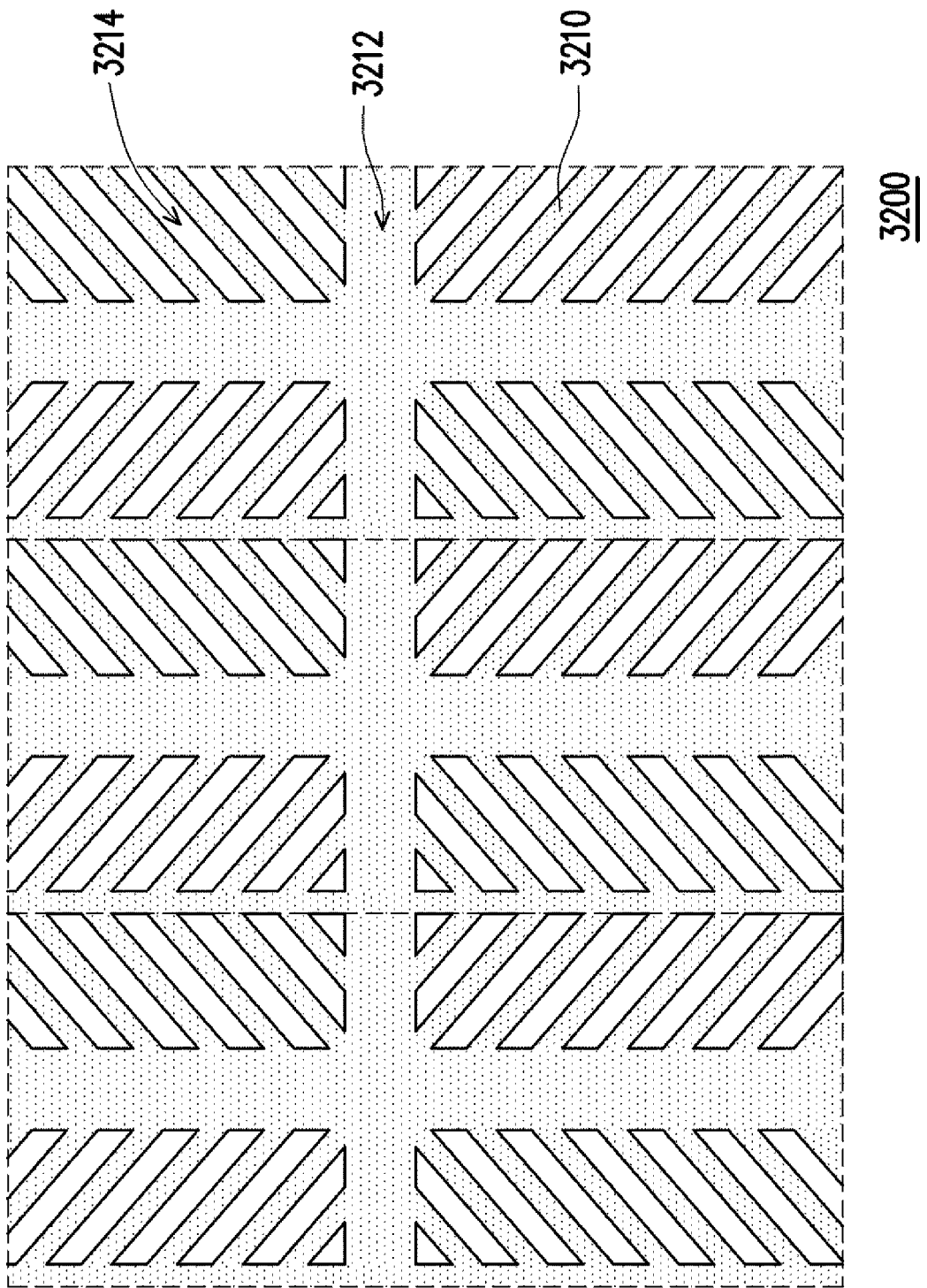

FIG. 6 and FIG. 7 are respectively partial cross-sectional views of a first substrate and a second substrate of an LCD according to another embodiment of the present disclosure. In addition, the pixel regions respectively shown in FIG. 6 and FIG. 7 are roughly aligned. Referring to FIG. 6, the first substrate 3100 is an active device array, for example. That is the first substrate 3100 has a plurality of pixel electrodes 3110 separated from each other. Each of the domain formation means 3112 is a hollow region of the pixel electrode 3110, and the domain formation means 3112 are similar to the domain formation means 1112 in FIG. 2. Referring to FIG. 7, the patterned electrode layer 3210 of the second substrate 3200 is a common electrode. The patterned electrode layer 3210 is similar to the patterned electrode layer 1210 in FIG. 3. The patterned electrode layer 3210 has a plurality of complete coverage regions 3212 and at least one slit distribution region 3214.

FIGS. 8 to 11 are respectively schematic diagrams of a domain formation means and a patterned electrode layer in a single pixel region of an LCD according to another four embodiments. The embodiment illustrated in FIG. 8 includes an oval domain formation means 4112 along with an oval complete coverage region 4212. The length and the width of the domain formation means 4112 may be substantially greater than one tenth of the length and the width of a single pixel region. Also, the distance between the complete coverage region 4212 and the edge of pixel region may be substantially smaller than half of the distance between the domain formation means 4112 and the edge of the pixel region. In contrast, the embodiment illustrated in FIG. 9 includes a circular domain formation means 5112 along with an oval complete coverage region 4212. Referring to FIG. 10, the embodiment illustrated therein includes a circular domain formation means 5112 along with a circular complete coverage region 5212.

Referring to FIG. 11, a domain formation means 6112 of the embodiment includes a first branch 6112a, a second branch 6112b, and a plurality of third branches 6113c. In addition, the domain formation means 6112 is used together with an oval complete coverage region 6212. The first branch 6112a and the second branch 6112b are substantially perpendicular to one another such that four quadrants are defined.

The azimuths of the third branches 6112c relative to the second branch 6112b in the same quadrant are the same, wherein the azimuths of the third branches 6112c relative to the second branch 6112b in the quadrants are respectively 45 degrees, 135 degrees, 225 degrees and 315 degrees.

FIG. 12 is a schematic diagram of a domain formation means and a patterned electrode layer in a single pixel region according to another embodiment. Referring to FIG. 12, an LCD of the embodiment is a transflective type LCD. Specifically, each of the pixel regions are divided into a transparent region T10 and a reflective region R10. As shown in FIG. 12, a first domain formation means 1112 is located in the transparent region T10. Also, a second domain formation means 7112 may be located in each of the reflective region R10, so as to control the slanting directions of the molecules in the LC layer (not shown). Furthermore, a patterned electrode layer 7210 in the transparent region T10 is similar to the patterned electrode layer 1210 in FIG. 3. The reflective region R10 is divided into four quadrants, for example. Slits 7216 of slit distribution regions 7214 of the patterned electrode layer 7210 in the same quadrant are parallel to one another. Further, the slits 7216 in each of the quadrants are substantially perpendicular to the slits 7216 in the adjacent quadrants. It is should be noted that the design of the patterned electrode layer may be applied in a transmissive LCD or reflective LCD.

Figure 14:
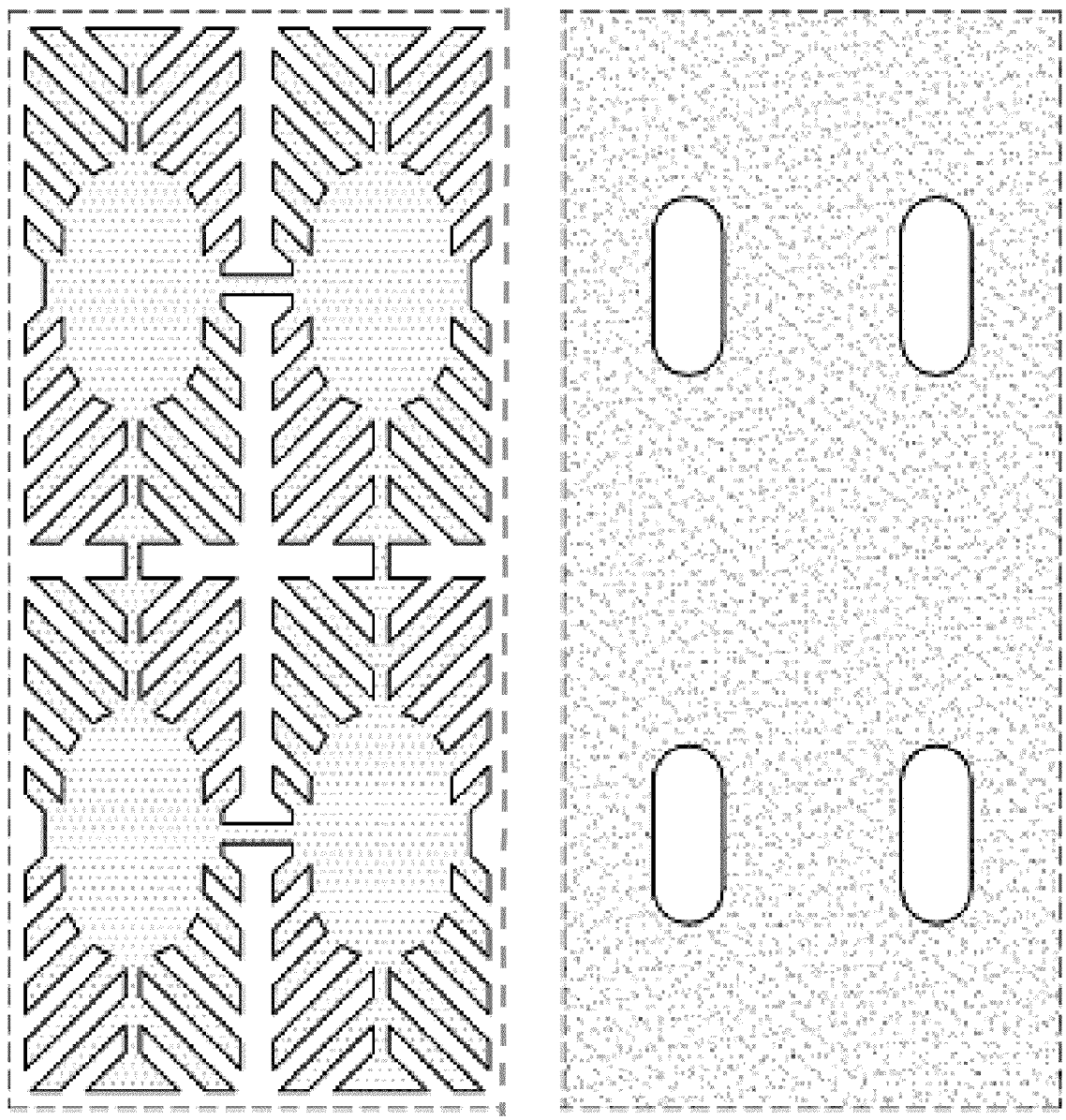
FIGS. 14 to 16 are respectively schematic diagrams of a domain formation means and a patterned electrode layer in a single pixel region of an LCD according to another three embodiments.
Figure 15:
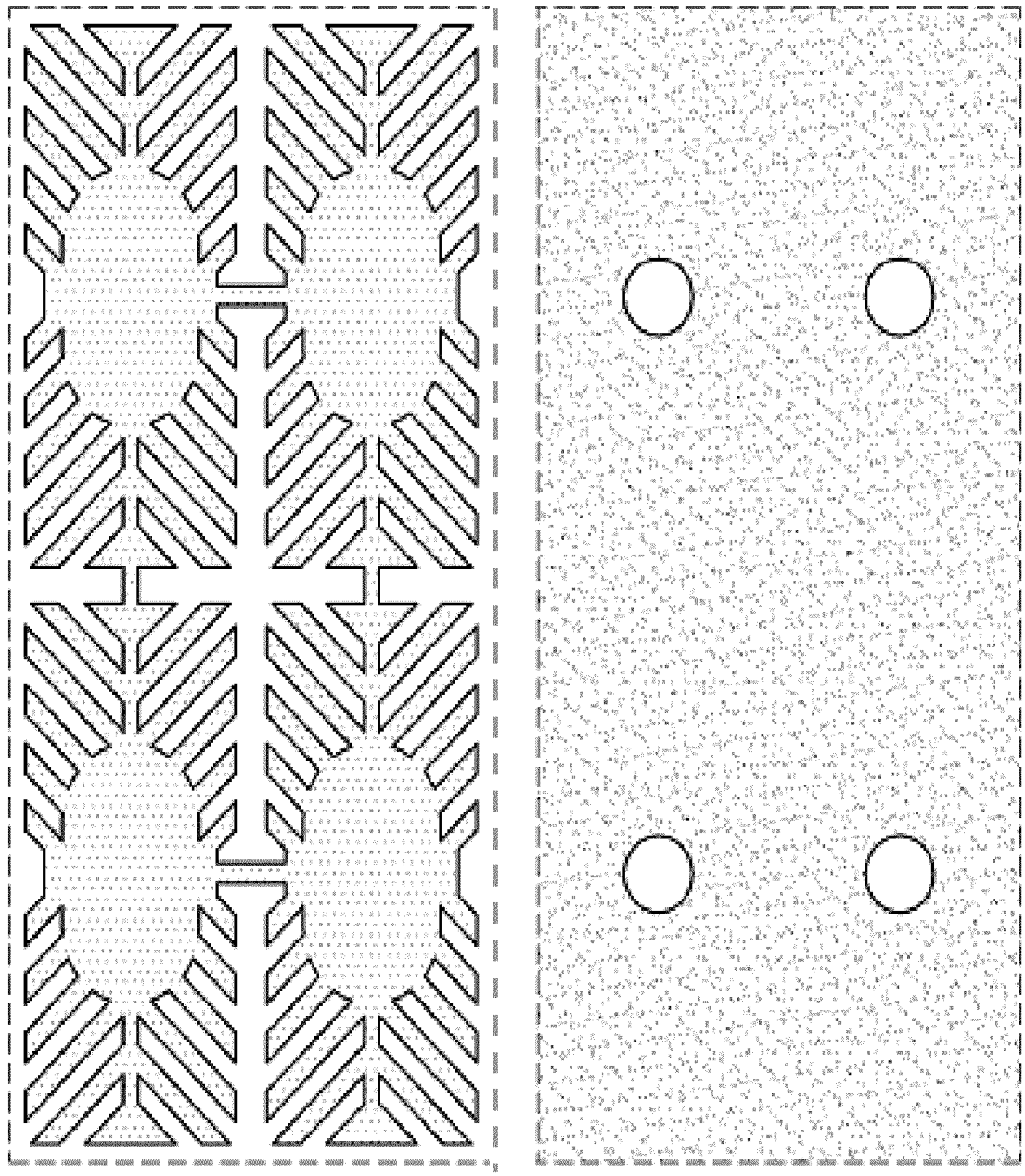
Figure 16:
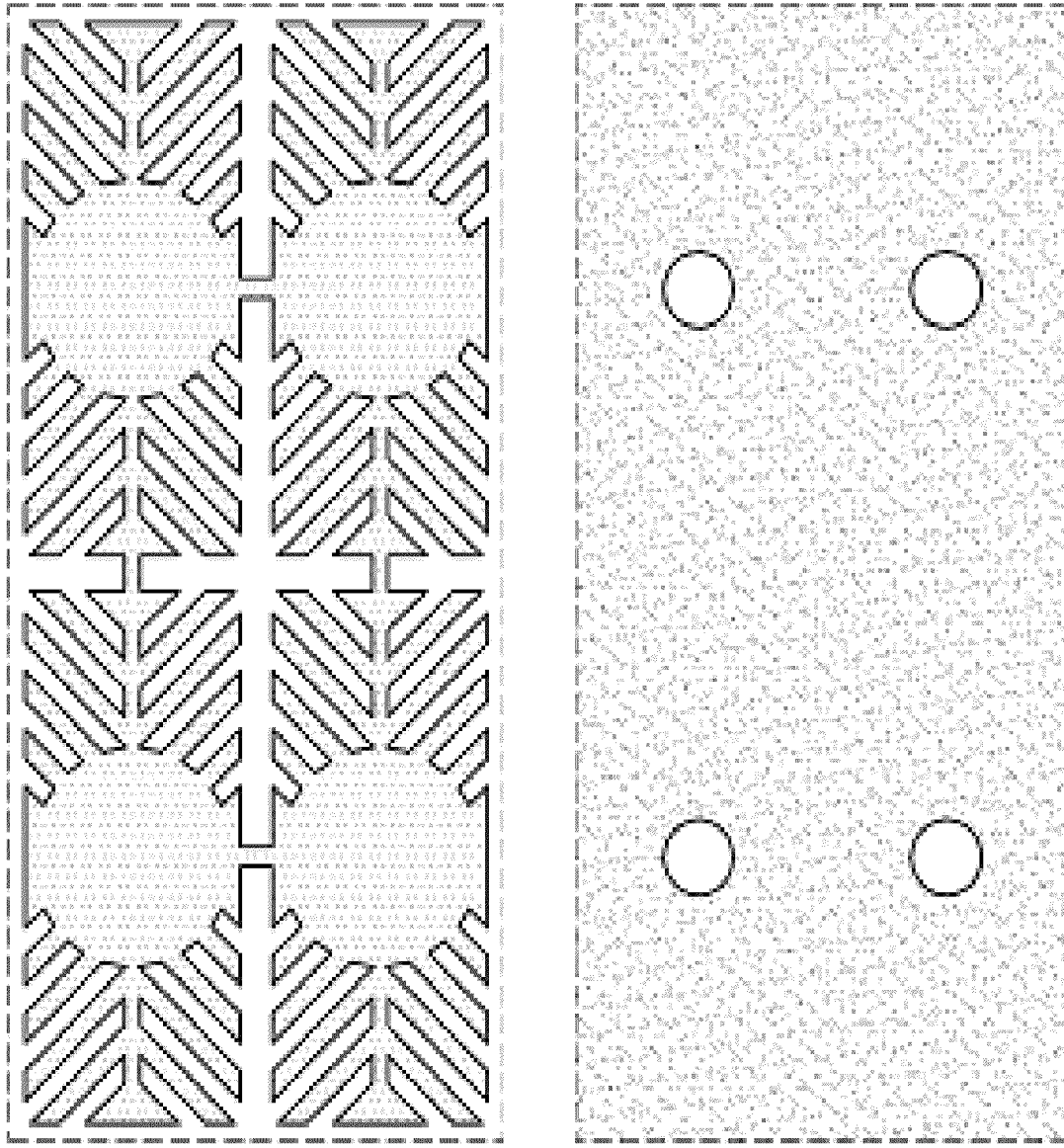

FIGS. 14 to 16 are respectively schematic diagrams of a domain formation means and a patterned electrode layer in a single pixel region of an LCD according to another three embodiments. Referring to FIG. 14, in the embodiment, the domain formation means and the patterned electrode layer of FIG. 8 are replicated in a single pixel region. In design, it must meet several requirements related to the present disclosure as mentioned above. FIG. 15 and FIG. 16 are schematic diagrams that are similar to FIG. 9 and FIG. 10, respectively. However, in the embodiments illustrated in FIG. 15 and FIG. 16, the domain formation means and the patterned electrode layer are replicated in a single pixel region.

Figure 13:
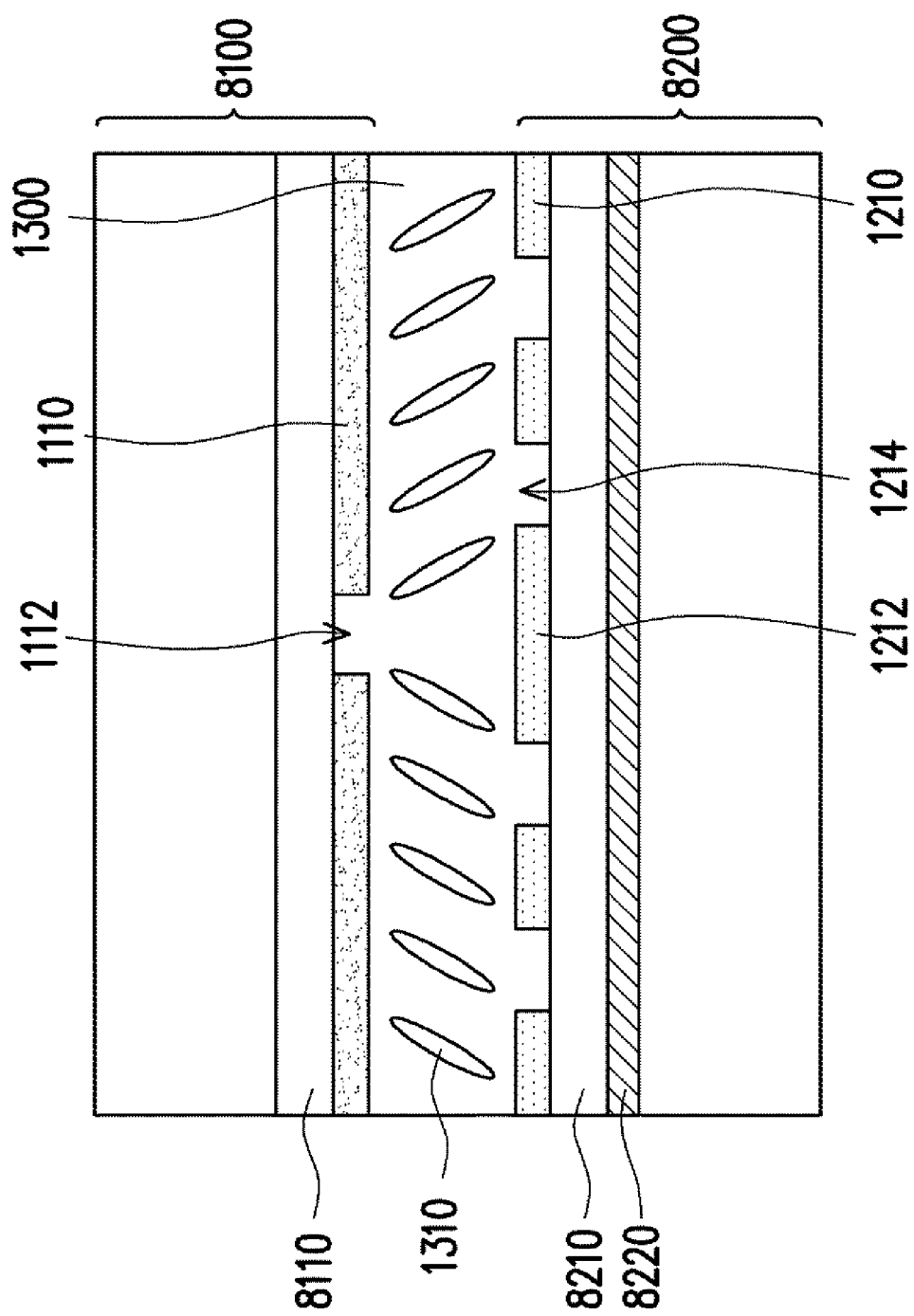
FIG. 13 is a partial enlarged view of a single pixel region of an LCD according to another embodiment.

FIG. 13 is a partial enlarged view of a single pixel P10 region of an LCD according to another embodiment. The LCD of the embodiment is similar to the LCDs illustrated in FIG. 1 and FIG. 4. However, in FIG. 13, a first substrate 8100 includes an overcoating layer 8110, and the common electrode 1100 is positioned between the LC layer 1300 and the overcoating layer 8110. The overcoating layer 8110 is able to provide a planar surface such that the planarity of the common electrode 1100 is enhanced. Thus, a uniform electric field is created in the LC layer 1300, so that the display quality is improved. Also, a second substrate 8200 includes an overcoating layer 8210. The scan lines, the data lines and the active devices included in a device layer 8220 are positioned on the same side of the overcoating layer 8210. The patterned electrode layer 1212 and the active devices 8220 are disposed on two opposite sides of the overcoating layer 8210. The overcoating layer 8210 increases the distance between the patterned electrode layer 1212 and the device layer 8220, which includes the scan lines, the data lines and the active devices. Hence, the cross talk that occurs due to the parasitic capacitance between the patterned electrode layer 1212 and the device layer 8220 is reduced, such that the display quality is improved. The material of the overcoating layers 8110, 8210 may be a thermosetting resin, for example, polymethyl methacrylate (PMMA), polycarbonate (PC), polystyrene (PS) or a light hardening resin such as a UV curable photoresist, etc. Even though both the overcoating layers 8110 and 8210 exemplary exist in the embodiment, the overcoating layer 8110 and the overcoating layer 8210 may exist alone in another embodiment.

As discussed above, the LCD of the present disclosure has a complete coverage region and a slit distribution region of the patterned electrode layer, which are able to stabilize the slanting directions of LC molecules. Thus, the LCD of the disclosure has high transmittance and high transmittance contrast, and the LC molecules also recover easily after being pressed. Further, the slanting directions of the LC molecules are effectively controlled by the domain formation means together with the complete coverage region, such that a wide viewing angle is achieved, and the transmittance and the transmittance contrast are enhanced as well.

Although the present disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A liquid crystal display (LCD) having a plurality of pixel regions, the LCD comprising:
   a first substrate having a plurality of domain formation means which comprises a plurality of first domain formation means;
   a second substrate having a patterned electrode layer, wherein the patterned electrode layer has a plurality of complete coverage regions and at least one slits distribution region, and each of the complete coverage regions is located in the corresponding pixel region and corresponding to each of the first domain formation means; and
   an liquid crystal (LC) layer disposed between the first substrate and the second substrate, wherein LC molecules of the LC layer have various slanting directions, each of the complete coverage regions is located at a slanting center of the slanting directions of the LC molecules, and the slits distribution region is used for stabilizing the slanting directions of the LC molecules, wherein an area of a projection of each of the complete coverage regions covering each of the corresponding first domain formation means, wherein a shape of each of the first domain formation means is point symmetric and the area of a projection of each complete coverage region on the first substrate is larger than an area of the corresponding first domain formation means on the first substrate, wherein each of the first domain formation means has a first branch, a second branch and a plurality of third branches, the first branch and the second branch are substantially perpendicular to one another such that four quadrants are defined, and azimuths of the third branches relative to the second branch in the same quadrant are the same, and the azimuths of the third branches in the quadrants are respectively 45 degrees, 135 degrees, 225 degrees and 315 degrees.

2. The LCD of claim 1, wherein a length and a width of the domain formation means may be substantially greater than one tenth of a length and a width of a single pixel region.

3. The LCD of claim 1, wherein the first substrate further comprises a common electrode, the second substrate further comprises a plurality of scan lines, a plurality of data lines and a plurality of active devices, the patterned electrode layer comprises a plurality of pixel electrodes, each of the pixel electrodes has one of the complete coverage regions, the data lines and the scan lines define the pixel regions, each of the active devices is located in the corresponding pixel region and is driven via the corresponding scan line, and each of the pixel electrodes is located in the corresponding pixel region and is electrically connected to the corresponding active device so as to receive a signal transmitted via the corresponding data line.

4. The LCD of claim 3, wherein each of the first domain formation means is selected from a domain formation protrusion disposed on the common electrode or a hollow region of the common electrode.

5. The LCD of claim 3, wherein the first substrate further comprises an overcoating layer, and the common electrode is between the LC layer and the overcoating layer.

6. The LCD of claim 3, wherein the second substrate further comprises an overcoating layer, and the scan lines, the data lines and the active devices are at the same side of the overcoating layer, and the patterned electrode layer and the active devices are disposed on two opposite sides of the overcoating layer.

7. The LCD of claim 1, wherein the first substrate further comprises a plurality of scan lines, a plurality of data lines, a plurality of pixel electrodes and a plurality of active devices, the data lines and the scan lines define the pixel regions, each of the active devices is located in the corresponding pixel region and is driven via the corresponding scan line, each of the pixel electrodes is located in the corresponding pixel region and is electrically connected to the corresponding active device so as to receive a signal transmitted via the corresponding data line, and the patterned electrode layer is a common electrode.

8. The LCD of claim 1, wherein a shape of each of the first domain formation means is a circle, an ellipse or a cross.

9. The LCD of claim 1, wherein each of the pixel regions is divided into a transparent region and a reflective region, and the first domain formation means are located in the transparent regions.

10. The LCD of claim 9, wherein the first substrate further has a plurality of second domain formation means, and each of the second domain formation means is located in the corresponding reflective region.

11. The LCD of claim 1, wherein each of the pixel regions are divided into four quadrants, a plurality of slits of the slits distribution region in the same quadrant are parallel to one another, and the slits in any one of the quadrants are substantially perpendicular to the slits in the adjacent quadrants.

12. The LCD of claim 1, wherein the first substrate has a domain formation means, and the domain formation means comprises a LC stabilizing polymer layer for controlling the slanting directions of the LC molecules on a surface of the first substrate.

13. The LCD of claim 12, wherein the LC stabilizing polymer layer is polymerized from a plurality of reactive group monomers which have reactive groups.

14. The LCD of claim 13, wherein the reactive groups of the reactive group monomers are acrylate, methacrylate or epoxy.

15. The LCD of claim 14, wherein a molecular formula of the reactive group monomers is represented as formula (1):

formula (1):

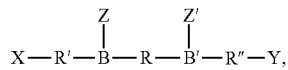

wherein B and B' are aromatic or saturated ring core;
X and Y are reactive groups;
R, R' and R'' are binding groups; and
Z and Z' are side chain substituents, wherein R, R and R'' respectively comprises alkylene.

16. The LCD of claim 15, wherein a material of the reactive group monomers is:

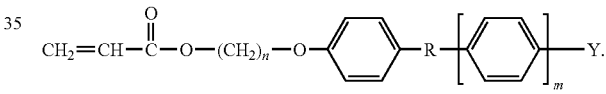

17. The LCD of claim 15, wherein a material of the reactive group monomers is:

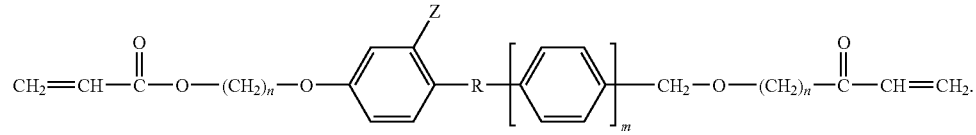

* * * * *